United States Patent

Andersson

[11] Patent Number: 5,966,091
[45] Date of Patent: Oct. 12, 1999

[54] PROCEDURE AND DEVICE FOR THE CONTROL OF A RADAR UNIT

[75] Inventor: Bengt Andersson, Kullavik, Sweden

[73] Assignee: Telefonaktiebolaget LM Ericsson, Stockholm, Sweden

[21] Appl. No.: 08/984,680

[22] Filed: Dec. 3, 1997

[30] Foreign Application Priority Data

Dec. 4, 1996 [SE] Sweden ................................. 9604465

[51] Int. Cl.⁶ ...................................................... G01S 7/28
[52] U.S. Cl. ............................... 342/60; 342/57; 342/58; 342/82
[58] Field of Search ................................. 342/60, 50, 57, 342/58, 82

[56] References Cited

U.S. PATENT DOCUMENTS

| | | | |
|---|---|---|---|
| 2,468,083 | 4/1949 | Labin et al. | 342/60 |
| 3,550,124 | 12/1970 | Heft et al. | 342/58 |
| 4,733,238 | 3/1988 | Fiden | 342/60 |
| 4,764,769 | 8/1988 | Hayworth et al. | 342/50 |
| 5,093,663 | 3/1992 | Baechtiger et al. | 342/60 |
| 5,220,331 | 6/1993 | Gunter | 342/70 |

FOREIGN PATENT DOCUMENTS

| | | |
|---|---|---|
| 289 549 | 5/1994 | European Pat. Off. . |
| 59-72072 | 4/1984 | Japan . |
| 2 129 644 | 5/1984 | United Kingdom . |

Primary Examiner—John B. Sotomayor
Attorney, Agent, or Firm—Burns, Doane, Swecker & Mathis, L.L.P.

[57] ABSTRACT

A procedure and a device transmit information in a pulse radar device simultaneously with the ordinary radar function of the pulse radar device. The radar device includes a control unit, a radar transmitter and an antenna. The control unit controls the radar transmitter to generate radar pulses in pulse groups that are transmitted via the antenna. The pulse groups for the ordinary radar function are information coded by position coding by the control unit of the information that is to be transmitted. The pulse groups are position coded by transmitting radar pulses with time displacements relative to their nominal radar pulse positions. Pulses are received and information decoded to thereby recreate, in the form of an information copy, information that has been positions coded and transmitted by a radar device.

28 Claims, 3 Drawing Sheets

PROCEDURE AND DEVICE FOR THE CONTROL OF A RADAR UNIT

BACKGROUND

This invention concerns a procedure and device for combining the transmission of information and radar function in a radar unit.

The main task of a radar unit is the detection of targets and the measurement of target data. In addition there might be a desire for a radar to be able to transmit information using its radar transmitter and antenna, that is to act as a data link terminal for the transmission of information.

Certain previous attempts to use a radar unit for the transmission of information in addition to its radar function were carried out mainly by using time multiplexing. Time multiplexing involves the radar unit at a certain moment in time working either as its main function as a radar unit or as a data link terminal, but not as both simultaneously.

The American patent U.S. Pat. No. 4,764,769 describes a system for the transmission of data using a radar unit that separates data pulses and radar pulses. The radar pulses are transmitted with a constant pulse repetition interval (PRI) with encoded information transmission in between. The encoded information transmission appears to use the radar pulses as reference timepoints. The aim of U.S. Pat. No. 4,764,769 appears to be the specific transmission of information that is required to remotely-control an unmanned vessel. The method does not appear to be suitable for any other application or for any other type of radar unit. The method impairs the performance of the radar function considerably and is not compatible with Doppler radar.

The British patent application GB 2129644 describes a system where the data encoding converts a binary one to a normal radar pulse and a binary zero to the omission of a radar pulse. This method affects the radar function and is not compatible with Doppler radar.

It can be regarded as a great disadvantage of all the above systems that the normal radar function is impaired when combined with data transmission or information transmission. The transmission of data makes the radar function either impossible or considerably poorer as the above systems work either as a radar system or as a transmission system. In order to improve this situation there have been developments towards systems where the radar unit transmits information at the same time as carrying out its main function as a radar unit.

In the European patent EP 289549 a method is given for the simultaneous transmission of information together with radar function. The method can be described briefly as follows: the transmitted signal is phase-modulated in one of two positions, 0° or 180°, where the modulation is controlled by the information that is to be transmitted. When the information is received the phase position is evaluated to extract the transmitted information. Upon the reception of a target echo signal in the radar unit the phase position is reset by phase adjustment (information about the phase position is available from the previously transmitted signal). It can, however, be regarded as a disadvantage of this method that the transmitted signal is phase adjusted before transmission and then phase adjusted again as a target echo signal upon reception. Each signal processing (which is what a phase adjustment is) that the radar signal undergoes can distort the radar signal to a greater or lesser degree in addition to the intended change. This means that the target echo signal can show phase errors and other unwanted distortions due to the two phase adjustments. Certain types of radar such as low PRF pulse Doppler radar (LPD) are dependent upon a correct phase for best performance (PRF=pulse repetition frequency). The method in accordance with EP 289549 is not suitable for medium and high PRF pulse Doppler radar (MPD and HPD) at all, as a radar unit with any of these wave forms cannot distinguish target echo signals originating from different transmission pulses on account of the distance ambiguity. This problem can also arise using LPD with so-called second-time-round echoes. The method in accordance with EP 289549 therefore involves a deterioration of the performance of the radar unit.

A major problem with previous solutions for the transmission of information using a radar unit is thus being able to carry this out without at the same time impairing the performance of the radar function. Either the information transmission takes up valuable radar function time, that is to say the more information that is to be sent, the less time there is available for the radar function, or the information transmission impairs the performance of the radar function by distorting the radar signal in a way that is detrimental to the radar function.

SUMMARY

This invention has as its aim the transmission of information via a radar unit without impairing the performance of the radar function, thereby overcoming the above problems and defects associated with previously known solutions for the transmission of information via a radar unit.

Another aim of the invention is to describe a procedure and device for using a pulse Doppler radar unit for simultaneous radar function and information transmission without the radar function being affected.

A further aim of the invention is to describe a procedure and a device for receiving information transmitted via a radar unit.

The above aims are achieved in accordance with the invention by a pulse radar device that transmits information simultaneous with its ordinary radar function. The pulse radar device comprises a control unit, a radar transmitter, a radar receiver and an antenna. The control unit is arranged to control the radar transmitter to generate radar pulses in pulse groups that are transmitted via the antenna. The control unit is also arranged to control the radar receiver to receive target echo signals from the transmitted radar signals via the antenna, for target detection and the measurement of target data. According to the invention the control unit information is arranged to information code the pulse groups with the information that is to be transmitted. The information coding is carried out by controlling the radar transmitter and radar receiver in such a way that the pulse groups are position coded by means of transmitting radar pulses with time displacements relative to their nominal radar pulse positions and by the ordinary radar function being retained. Nominal radar pulse position/time is the position/time when a radar pulse would have been sent if it was not information coded.

The information coding can suitably be carried out by position coding consecutive pulse groups. Individual pulses in a pulse group are not position coded individually, but have their ordinary positions relative to each other. This type of position coding is most suitable for Doppler radar of the MPD and HPD type.

Another alternative is for the information coding to be carried out by determining the sequence of different pulse groups with different position coding of the pulses in the different pulse groups but where the pulses within a pulse group are position coded equally relative to each other. This method is most suitable for Doppler radar of the MPD type where a certain number of pulse groups with different pulse repetition frequencies are used. The information coding is thus carried out by the selection of the sequence of pulse groups with different pulse repetition frequencies.

The information coding can also be carried out by a combination of the two methods just described. This means that the information coding is carried out by the position coding of consecutive pulse groups and by the determination of the sequence of different pulse groups with different pulse repetition frequencies.

The above aims are also achieved by means of a procedure for transmitting information in a pulse radar device at the same time as the ordinary radar function of the pulse radar device. The pulse radar device includes a control unit, a radar transmitter and an antenna. The control unit controls the radar transmitter to generate radar pulses that are transmitted via the antenna. The radar pulses for the ordinary radar function in at least one pulse group are information coded by the control unit with the information that is to be sent. The information coding is carried out by a pulse group position coding where all of the radar pulses of a pulse group are position coded in such a way that the radar pulses in the pulse group are transmitted retaining the ordinary radar function. The information coding in certain types of radar can also suitably be carried out by the position coding of consecutive pulse groups. The position coding of single or consecutive pulse groups can suitably be carried out by a position coding time displacing all the radar pulses in a pulse group by the same amount relative to the respective nominal radar pulse positions of the radar pulses. These time displacements are suitably done on all of the radar pulses in a pulse group thereby information coding a pulse group by determining a time displacement of the pulse group. The information coding can suitably also be carried out by letting the position coding of all of the radar pulses in a pulse group be carried out by means of time displacing the radarpulses in the pulse group relative to the first radarpulse in the pulse group in such a way that an equal time distance/ displacement between all of the radar pulses in the pulse group is attained to thereby information code a pulse group by determining the pulse repetition frequency of the pulse group. The information coding can also suitably be carried out by the position coding of all of the radar pulses of a pulse group is carried out by means of having the first pulse of the pulse group be transmitted at its nominal radar pulse position and that the remaining radar pulses of the pulse group are time displaced in such a way that an equal time displacement between all of the radar pulses in the pulse group is attained to thereby information code a pulse group by determining the pulse repetion freqeuncy of the pulse group. The information coding can suitably also be carried out by determining the sequence of different pulse group position codings in certain types of radar. The information coding can also be carried out by a combination of determining the pulse repetition frequency of the pulse group and by determining a time displacement of the pulse group.

The above aims are also achieved by a procedure for controlling a radar unit in order to make possible the transmission of information from the radar unit using the radar pulses of the radar unit combined with simultaneous radar function. The procedure comprises a control stage in which the number of pulse groups that are to be transmitted is determined in order to retain a correct ordinary radar function. The control stage also determines the times of transmission of the radar pulses in the pulse groups whereby an information coding with the information that is to be transmitted is carried out by a pulse group position coding where all the radar pulses of at least one pulse group are position coded in such a way that the radar pulses of the pulse group are transmitted with a a retained ordinary radar function. The procedure can suitably also include an information accumulation stage in which information that is to be transmitted is collected and forms an information quantity either during a predetermined period of time or until a predetermined amount of information is collected, depending upon which of these conditions is fulfilled first. With an information accumulation stage the number of pulse groups that are to be transmitted is also determined in the control stage, depending upon the amount of information. The information accumulation stage and the control stage can suitably be repeated continually as long as a radar function or a transmission of information is required. The radar pulses can suitably be information coded with a position coding in accordance with one of the methods already described.

The above aims are also achieved by a procedure for receiving and information decoding radar pulses in an information receiver, thereby recreating an information copy of the information that has been encoded and transmitted by a radar device. The procedure comprises a first calculation stage, a second calculation stage, a pulse repetition frequency calculation stage, and a third calculation stage. The first calculation stage calculates an expected radar pulse position for each received radar pulse. The expected radar pulse position for a radar pulse in the information receiver corresponds to the nominal radar pulse position for the same radar pulse in the radar unit. If a radar pulse is not information/position coded it is expected that it will arrive at and be received by the information receiver at an expected radar pulse position. The second calculation stage calculates a time displacement relative to the respective calculated expected radar pulse position for each radar pulse received. The pulse repetition frequency calculation stage calculates the pulse repetition frequency of the received radar pulses and usually also their sequence. The third calculation stage thereafter calculates the information copy from one or more calculated time displacements and also from the calculated pulse repetition frequencies of the received radar pulses and/or the sequence of the pulse repetition frequencies. The procedure can suitably also include an identification stage in which the type of information coding of the radar device is identified from the received radar pulses. The third calculation stage can then also calculate the information copy from the identified information coding type.

The above aims are also achieved by means of a procedure for receiving radar pulses in an information receiver and information decoding them and thereby recreating an information copy of the information that has been encoded and transmitted by a radar unit. The procedure comprises a pulse repetition frequency calculation stage, a calculation stage and usually a pulse repetition frequency sequence calculation stage. The pulse repetition frequency calculation stage calculates the pulse repetition frequency of received radar pulses. The pulse repetition frequency sequence calculation stage calculates the sequence of pulse repetition frequencies. The calculation stage calculates the information copy from one or more calculated pulse repetition frequencies and/or the calculated sequence of pulse repetition frequencies In a preferred embodiment the calculations are performed on pulse groups instead of only on individual radar pulses.

The above aims are also achieved by means of a procedure for the transmission of information between a radar unit and an information receiver using the radar pulses generated by the radar unit. The procedure includes a control stage in the radar unit and a first, second and third calculation stage in the information receiver. The control stage in the radar unit determines the number of pulse groups that must be transmitted in order to retain a correct ordinary radar function. The control stage in the radar unit also determines the times of transmission of the radar pulses of the pulse groups whereby an information coding with the information that is to be transmitted is carried out by a pulse group position coding where all the radar pulses in at least one pulse group are position coded in such a way that the radar pulses in the pulse group are transmitted with retained ordinary radar function. The first calculation stage in the information receiver calculates an expected radar pulse position for each received radar pulse where the expected radar pulse position for a radar pulse in the information receiver corresponds to the nominal radar pulse position for the same radar pulse in the radar unit. The second calculation stage in the information receiver calculates a time displacement relative to the respective calculated expected radar pulse position for each received radar pulse. The third calculation stage in the information receiver calculates the information copy from one or more calculated time displacements.

The above aims can also be achieved by means of a pulse radar device that can transmit information simultaneously with its ordinary radar function. The pulse radar device comprises a control unit, a radar transmitter, a radar receiver and an antenna. The control unit is arranged to control the radar transmitter to generate radar pulses that are transmitted via the antenna. The control unit is also arranged to cooperate with the radar transmitter to control the radar receiver to receive target echo signals from the transmitted radar signals via the antenna for target detection and measurement of target data. The control unit is also configured to information code the radar pulses of at least one pulse group with the information that is to be transmitted. The information coding is carried out by controlling the radar transmitter and radar receiver so that the radar pulses of the pulse group are position coded in such a way that the radar pulses of the pulse group are transmitted retaining the ordinary radar function. The information coding can suitably be carried out by position coding in accordance with one of the previously described devices.

The above aims can also be achieved by means of an information receiver for receiving and information decoding radar pulses of pulse groups and thereby recreating information that has been encoded, for example position coded, and transmitted by a radar device. The information receiver recreates the information in the form of an information copy. The information receiver comprises an antenna, a receiver and a decoder. The receiver is arranged to receive radar pulses via the antenna, convert the radar pulses into signals modified for the decoder and pass these modified signals to the decoder. The decoder is arranged to calculate for each received pulse group its radar pulses' time displacement relative to a corresponding calculated expected radar pulse position. The decoder is also arranged to thereafter calculate the information copy from one or more calculated time displacements and from this recreate the information that was encoded and transmitted by the radar device. The decoder can also suitably be configured to identify from the pulse groups received what type of information coding the radar device uses to encode the information that is transmitted. The decoder can thereby also be configured to calculate and recreate the information that was encoded and transmitted by the radar device from an identified information coding.

The above aims can also be achieved by means of an information receiver for receiving and information decoding radar pulses of pulse groups and thereby recreate in the form of an information copy the information that has been encoded and transmitted by the radar device. The information receiver comprises an antenna, a receiver and a decoder. The receiver is arranged to receive radar pulses via the antenna, convert the radar pulses into signals modified for the decoder and pass these modified signals to the decoder. The decoder is arranged to calculate a pulse repetition frequency for each pulse group received and from one or more calculated pulse repetition frequencies thereafter calculate an information copy and thereby recreate the information that was encoded and transmitted by the radar device. The decoder is normally also arranged to calculate the sequence of pulse repetition frequencies and also to calculate the information copy from the calculated sequence.

The invention enables that the transmission of information can be carried out simultaneously with a fully-retained radar function by means of encoding the radar signal in a simple way. This achieves a number of different advantages compared to previously known techniques. Due to its simplicity the system is less complex than previously known solutions. The implementation of the invention in existing radar systems is simple. A reliable function for the transmission of large amounts of data is obtained. A reliable function for Doppler radar is obtained and the transmission of large amounts of data is possible. The invention enables that the transmission of information can be carried out with retained radar function, not only in a Doppler radar that utilizes the wave form LPD, but also the wave forms MPD and HPD. The fact that the radar function and the transmission of information take place simultaneously and with the same wave form means that the transmission of data can be carried out without increasing the output-power of the radar. All the available output-power can thus be used for the radar function. A further advantage is that it is not possible, for example by signal monitoring, to determine that there is data traffic, as ordinary radar pulses are used.

BRIEF DESCRIPTION OF THE DRAWINGS

In the following the invention will be described in greater detail for the purpose of explanation and in no way for the purpose of restriction, with reference to the attached figures, where.

DETAILED DESCRIPTION

Figure 1:
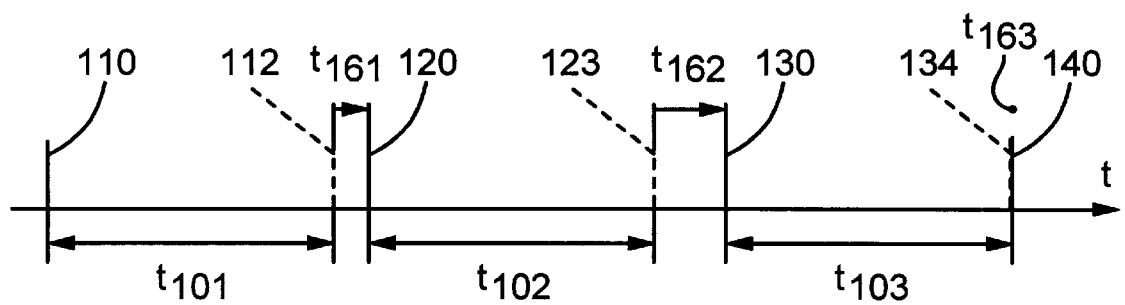
FIG. 1 shows a time diagram of radar pulses, encoded in accordance with the invention in a first example.

Some examples of different transmission systems adapted for different radar systems will be described in connection with the FIGS. 1 to 6 in order to clarify the invention. All the transmission systems in accordance with the invention have the same characteristic that the transmission of information is carried out simultaneously and together with the radar signal and on the terms of the radar signal, that is to say without any impairment of the radar function. This is possible in accordance with the invention by the transmission of information being carried out by the information coding of the ordinary radar pulses. The information coding of the radar pulses is carried out by a position coding (time displacement of transmission) of radar pulses in a way that does not affect the primary purpose of the radar pulses, i.e. target detection and measuring of target data. The position coding of the radar pulses is carried out in a way that is suitable for the type of pulse radar that is used.

The ordinary function of a radar unit is to determine the distance to a target. This is carried out by measuring the period of time that passes from the time a radar pulse is sent by the radar transmitter until the time that it is received in the radar receiver as a target echo. If the radar unit knows when a radar pulse was sent, the radar unit can calculate the time that passed until it received the target echo. It is not important to determine precisely when a radar pulse is sent, but it is necessary to know exactly when a radar pulse has been sent in order to be able to achieve a correct radar function. A radar unit can possibly also calculate a target's speed and other parameters. Transmission of information in accordance with the invention is carried out without extra radar pulses or any other pulses/signals being used. In accordance with the invention a radar unit's normal radar pulses are used without the ordinary radar function being affected.

A first embodiment of the invention uses pulse position coding and is principally suitable for radar without Doppler function and low PRF pulse Doppler radar (LPD). The information coding is carried out by the pulse position coding of individual radar pulses within small time intervals which do not affect the radar function, as the receiver is time synchronized to the transmitted radar pulse. The information coding is carried out preferably from pulse to pulse, that is the encoding is a time displacement from the nominal position for the following pulse. The nominal radar pulse position/time is the position/time when a radar pulse would be sent if it was not information coded. The time displacements can preferably be carried out in two different ways. The time displacements can be either only positive relative to the respective nominal positions, or both positive and negative around the respective nominal positions for the following pulses. A third way is that the time displacements are only negative relative to the nominal positions.

FIG. 1 shows a time diagram for the method with only positive time displacements with radar pulses 110, 120, 130, 140 and nominal positions 112, 123, 134. The time intervals t101, t102, t103 between the radar pulses 110, 120, 130 and the respective nominal position 112, 123, 134 for the following pulse 120, 130, 140 are the same length (here illustrated by a constant PRF, if the PRF is changed then the nominal position is also changed). The data/information coding is carried out as previously mentioned with positive time displacements t161, t162, t163 of the radar pulses 120, 130, 140 relative to the respective nominal position 112, 123, 134. The last shown radar pulse 140 in FIG. 1 coincides with the corresponding nominal position 134 and thus the time displacement t163 is zero. Radar pulses without a time displacement from the corresponding nominal position can indicate and mean different things depending upon the application.

If the information coding is carried out by only positive pulse position coding there can be a small reduction in the average transmitted power, normally of the order of a few percent or a few fractions of one percent.

Figure 2:
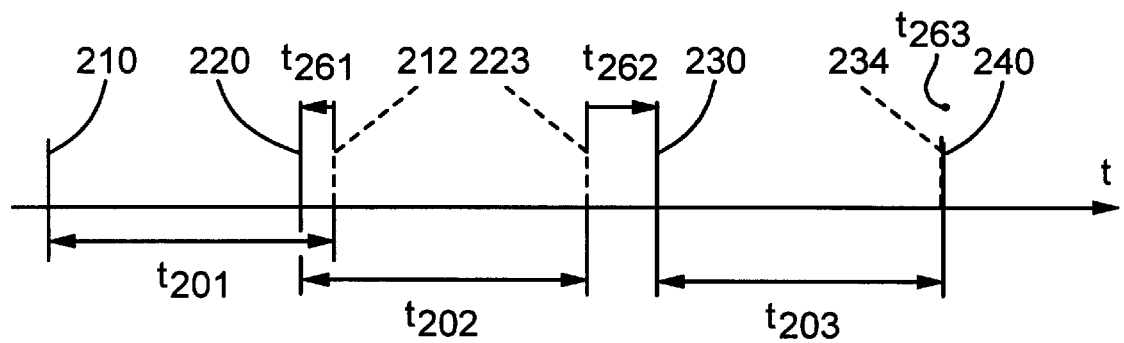
FIG. 2 shows a time diagram of radar pulses, encoded in accordance with the invention in a second example.

FIG. 2 shows a time diagram of the method with both positive and negative time displacements with radar pulses 210, 220, 230, 240 and nominal positions 212, 223, 234 in a corresponding way to that shown in FIG. 1. The time intervals t201, t202, t203 between the radar pulses 210, 220, 230 and the respective nominal position 212, 223, 234 for the following pulse 220, 230, 240 are the same length (here illustrated by a constant PRF, if the PRF is changed then the nominal position is also changed). In contrast to the previous example with only positive time displacements, in this example the information coding is carried out with both negative t261 and positive t262 time displacements with the radar pulses 220, 230, relative to the respective nominal position 212, 223. In this example it can be appropriate to let the radar pulses, where the time displacement t263 is zero (that is to say where the radar pulse 240 and its nominal position 234 coincide), represent no information transmission and at the same time be disallowed and invalid as information coding. The information transmission can normally over a long interval of time be considered to occur at random, for which reason negative and positive time displacements cancel each other out if the same number of codes in the information transmission are positive as are negative. This means that no accumulated time displacement will arise and the average transmitted power will be the same as without information transmission.

The information transmission speed depends upon a combination of what pulse repetition frequency the radar unit works with and the number of possible different time displacements. The number of possible different time displacements depends in turn on what least time displacement a receiver can reliably identify and what the maximum possible and acceptable time displacement is. With for example eight eligible time distances between adjacent transmitted pulses it is possible to encode a number from 0 to 7 (3 bits). For each transmitted pulse it is therefore possible to send a message corresponding to three bits. An LPD radar unit has a PRF (pulse repetition frequency) of one or several kHz which means a possible information transmission rate of about 3000 to 10,000 bits of information per second.

A second embodiment of the invention uses position coding of pulse groups and is primarily applicable in Doppler radar units, in particular medium PRF (MPD—medium PRF pulse Doppler radar) and high PRF (EPD—high PRF pulse Doppler radar). A Doppler radar unit requires for the wave forms MPD and HPD identical conditions concerning pulse distance, pulse appearance (including "microwave phase") within a pulse group. In order to achieve a correct radar function (with regard to among other things clutter suppression) it is necessary for the frequency spectrum of the signal to be concentrated in ranges with separation distances equal to the pulse frequency. Each modulation of the pulses within a pulse group, whether phase coding or position coding, introduces low frequency interference in the spectrum with subsequent disallowed components as a result. Therefore it is not possible to encode individual pulses within a pulse group, that is to say, for example, to use pulse position coding of individual radar pulses, and at the same time obtain a correct radar function.

For these wave forms (MPD and HPD) it is possible, in accordance with the invention, to let the information coding be carried out by the selection of the time distance between the pulse groups, that is to say that the position coding is carried out by one group of pulses at a time. A pulse group has a typical time extent of 10 milliseconds, for which reason the transmission rate will be lower than in the first version. On the other hand it is possible to send a longer message with each time displacement as the maximum acceptable time displacement is larger. A larger maximum time displacement means that more bits of information can be encoded per time displacement. As an example it is reasonable to assume that a receiver can decode time displacements between pulse groups if the encoding is carried out in steps of 0.5 microseconds. A variation in the time distance between the pulse groups of for example 512 microseconds can be regarded as acceptable, that is to say the maximum time displacement. This gives 1024 encoding possibilities (=10 bits) per 10 milliseconds, which results In a data transmission rate of about 1000 bits per second in this example.

Figure 3:
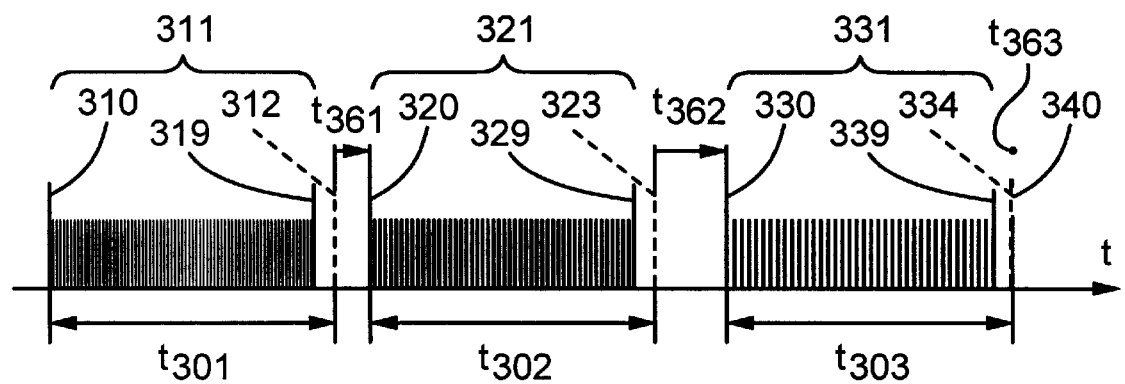
FIG. 3 shows a time diagram of radar pulse groups, encoded in accordance with the invention.

FIG. 3 shows a time diagram of the method with only positive time displacements. Preferably only positive time displacements are used for information coding in accordance with this method as the last radar pulse, 319, 329, 339 in each respective pulse group 311, 321, 331 usually comes too close to the respective nominal position 312, 323, 334 of the first radar pulse 320, 330, 340 in the following pulse group for a negative time displacement to be able to be carried out without "collisions". The time intervals t301, t302, t303 between the first radar pulses 310, 320, 330 in the pulse groups 311, 321, 331 and the respective nominal positions 312, 323, 334 of the first pulse in the following pulse group are the same length (here illustrated by a constant time displacement between pulse groups, if the time displacement is changed then the nominal position of the pulse group is also changed). The data/information coding is carried out as previously mentioned with positive time displacements t361, t362, t363 of the pulse groups. The time displacements t361, t362, t363 are indicated in the figure between the first radar pulse 320, 330, 340 in the respective pulse groups 321, 331 (the last pulse group is not shown, only its first radar pulse 340) and the respective nominal position 312, 323, 334 of the first radar pulse. The first radar pulse 340 in the last and not shown pulse group in FIG. 3 coincides with the nominal position 334 of the first pulse in the pulse group and the time displacement t363 is therefore zero.

Pulse groups without a time displacement from corresponding nominal start positions can indicate and mean different things to the receiver depending upon the application.

In a third embodiment the information coding is carried out by the selection of pulse repetition frequency sequence and has its main application in medium PRF pulse Doppler radar (MPD). All the pulses within a pulse group have the same time separation between each other, the position coding determines this time separation and thus determines the pulse repetition frequencies in the group. The information coding is thus carried out by the position coding being carried out on pulses within a pulse group. The information coding does this on a number of consecutive pulse groups, that is to say determines the PRF of each pulse group and thereby also the pulse repetition frequency sequence. A radar unit in wave form mode MPD uses N different pulse groups, where each group is characterized by a given pulse repetition frequency. During target illumination (Time on Target) it is desirable that all N possible pulse repetition frequencies are able to be used but the sequence of the pulse repetition frequencies is not important. Letting the data message/information control the sequence of the pulse repetition frequencies, makes possible information coding/transmission of data without at the same time causing interference or affecting the normal radar function.

The number of possible choices S of the pulse repetition frequency sequence is calculated using the formula S=Ni (factorial) where N is the number of pulse repetition frequencies. As an illustration with three possible pulse repetition frequencies the six (3!=6) different possible pulse repetition frequency sequences have the following sequence:

1: PRF1 PRF2 PRF3
2: PRF2 PRF3 PRF1
3: PRF3 PRF1 PRF2
4: PRF1 PRF3 PRF2
5: PEF2 PRF1 PRF3
6: PRF3 PRF2 PRF1 in a practical application it is usual and convenient to use a pulse repetition frequency sequence with about 7 to 9 different pulse repetition frequencies which gives considerably more encoding possibilities by the choice of a pulse repetition frequency sequence where N=7 gives S=5040
N=8 gives S=40320
N=9 gives S=362880 but for N=9 different pulse repetition frequencies that gives 362880 different possible choices of pulse repetition frequency sequence this corresponds to only approximately 18 binary information bits (262144 different combinations). Other combinations of pulse repetition frequency sequence can be used, for example, for synchronization, indication of start of transmission of information, indication of end of transmission of information and a number of different remaining combinations that are used when no transmission of information is taking place. Typically it takes 0.1 seconds for the transmission of a message of 18 bits when the time on target of each pulse repetition frequency is about 10 ms. This gives a data transmission rate of approx. 180 bits per second.

In order to increase the data transmission rate above 180 bits per second, increasing the combination options could be considered by not just selecting between a total of nine different pulse repetition frequencies, but for example selecting between about a hundred possible pulse repetition frequencies. There is one reservation concerning this increase and that is that you cannot normally completely arbitrarily select a sequence with these hundred possible pulse repetition frequencies. Among other things normally only one of for each position approx. ten pulse repetition frequencies can be selected for each of the for example nine positions.

A further variation of the invention is to combine position coding of pulse groups with coding of the pulse repetition frequency sequence. This makes possible an even higher data transmission rate.

Figure 4:
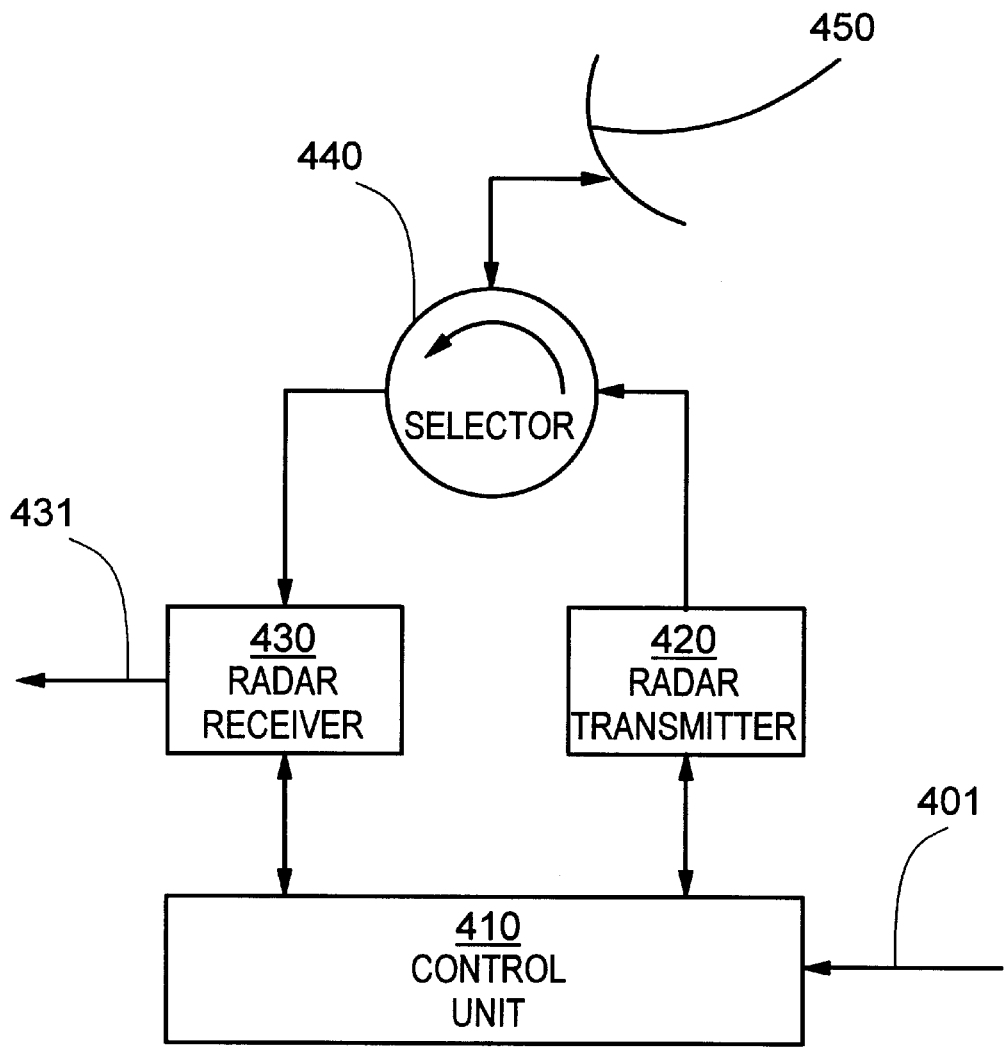
FIG. 4 shows a block diagram of a radar unit in accordance with the invention.

FIG. 4 shows a block diagram of a radar unit according to the invention. The radar unit comprises a radar transmitter 420, a radar receiver 430, a control unit 410, a Send/Receive selector 440 and an antenna 450. A usually binary information flow 401 that is to be transmitted is entered into the control unit 410. The control unit 410 controls the radar transmitter 420 in such a way that the radar signal that is sent via the Send/Receive selector and the antenna 450 is information coded in accordance with the invention depending upon the information flow 401. Depending upon the type of radar and the application, the radar signal is information coded in accordance with one of the methods described above. The radar receiver 430 is synchronized with the transmitted radar pulses/radar pulse groups via the control unit 410 which results in the radar function not being affected by the above-mentioned time displacements of radar pulses and radar pulse groups. From the radar receiver 430 the received target echo signals 431 are sent on for further signal processing and possible display which is not shown in this figure.

Figure 5:
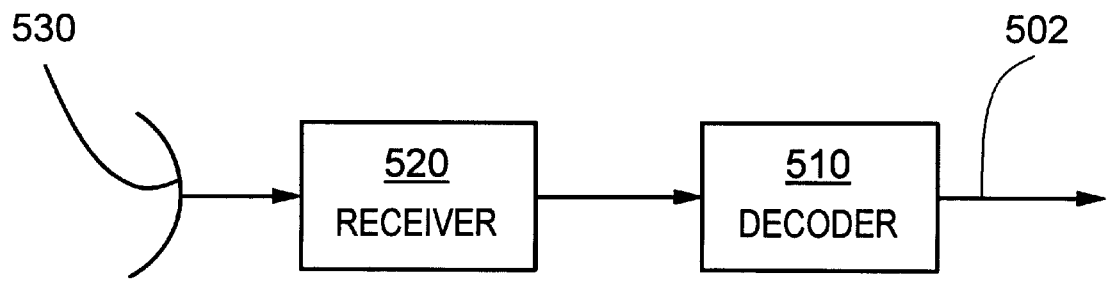
FIG. 5 shows a block diagram of a receiver in accordance with the invention.

FIG. 5 shows a block diagram of a suitable information receiver according to the invention for the reception of the information-coded pulses or pulse groups. The information receiver comprises an antenna 530, a receiver 520 and a decoder 510. The receiver 520 comprises suitable means of amplifying and demultiplexing the high frequency radar signals to base band level, where the received signals can be processed more simply either as analogue signals and/or digitally after analogue to digital conversion. The decoder 510 decodes the received signals into an information flow 502 that, if the encoding, transmission and decoding have worked properly, is a copy of the information flow 401 in FIG. 4 that was entered into the radar unit. If the information coding is carried out in a Doppler radar unit of LPD type or in a non-Doppler radar unit, the decoder 510 measures the time displacement of the pulses in the received signal. If it is an MPD or HPD radar unit that information codes the radar pulse groups, the decoder 510 measures the time displacements of the pulse groups and/or the PRF of the pulse groups in the received signal. The information receiver determines whether the received signals are information coded or not by for example determining whether there are any time displacements or not and/or whether it is a pulse repetition frequency sequence without any information coding. The information receiver can be designed for one type of radar with one specific information coding. A more advanced type of receiver can either be switched between or detect and automatically switch between several or all of the different types of radar with different information coding.

Figure 6:
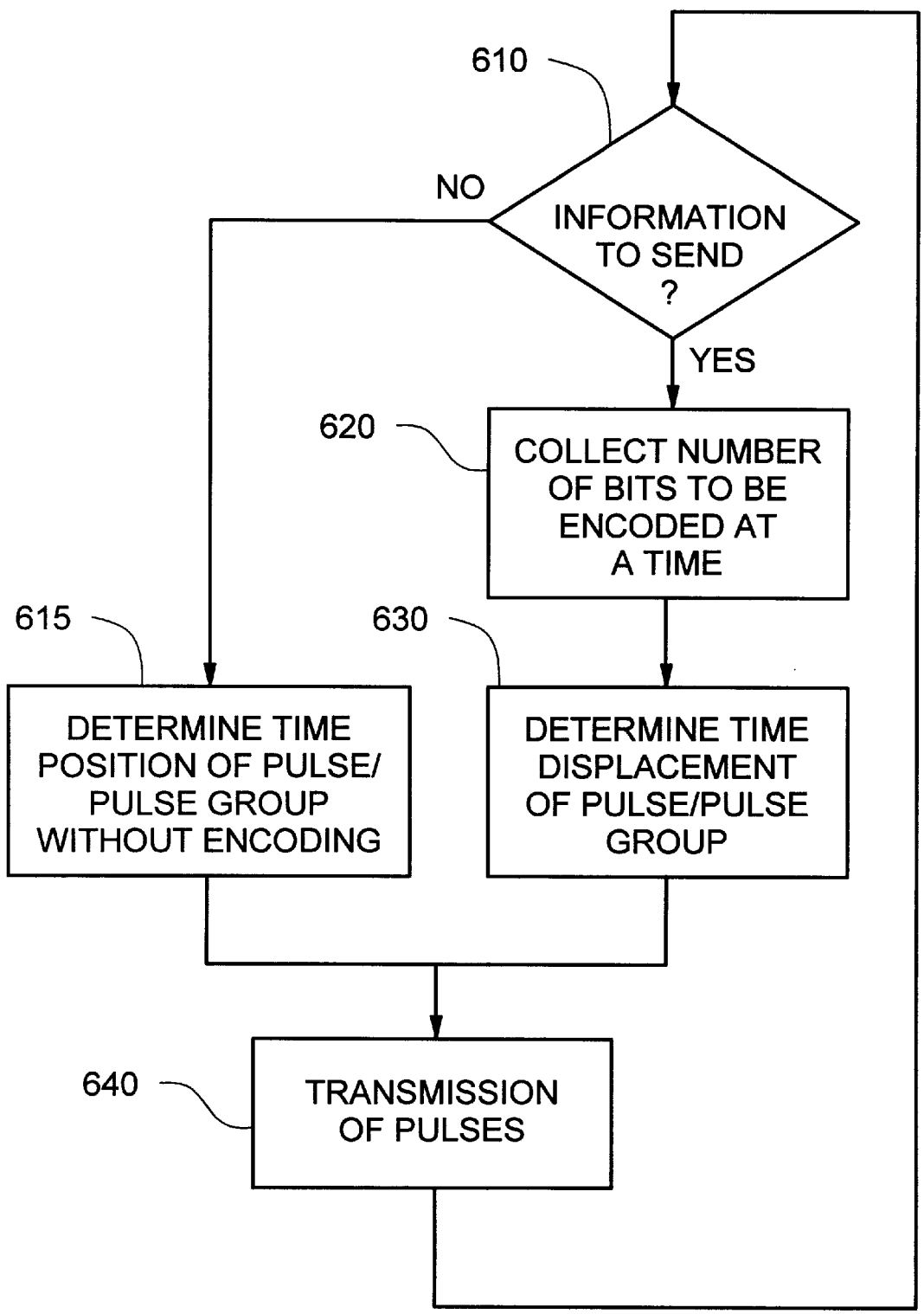
FIG. 6 shows a flow chart of a method in accordance with the invention.

FIG. 6 shows a flow chart for a method/procedure according to the invention that shows how a radar is controlled in order to make possible the transmission of information with simultaneous radar function using the radar signals of the radar unit. In a first stage, the test stage 610, it is checked whether there is any information/data to send. If there is no information to send the procedure continues to a non-encoding control stage 615 that determines the times of transmission of the radar pulses without information coding. The non-encoding control stage 615 also determines the number of radar pulses that must be sent to retain a correct radar function. The number of radar pulses that must be sent in total depends, as mentioned above, on the type of radar. Thereafter a radar pulse or one or more radar pulse groups are sent (as determined in the non-encoding control stage 615) in a transmission stage 640. Finally the procedure returns to the test stage 610 to investigate again whether there is any information to send.

If there is information/data to send the procedure goes from the test stage 610 first to an information accumulation stage 620. The information accumulation stage 620 collects the necessary quantity of information that is required for an efficient information coding of the radar pulses to be carried out in a subsequent encoding control stage 630. As mentioned above, for example 18 or more binary bits can form the basis for an information coding. The quantity of information that the information accumulation stage 620 collects depends upon the type of radar and the information coding. As neither the quantity of information, the time interval within which the quantity of information comes, nor the information transmission rate to the information accumulation stage 620 is usually known in advance, the information accumulation stage 620 can also have an upper time limit for the collection of information. The encoding control stage 630 uses the quantity of information that comes from the information accumulation stage 620 and determines from this the times of transmission of the radar pulses. In the same way as for the non-encoding control stage 615 the encoding control stage 630 determines the number of radar pulses that must be transmitted. The number of radar pulses that must be transmitted in total in order to retain a correct radar function depends as mentioned above on the type of radar. Thereafter a radar pulse or one or more radar pulse groups as determined in the encoding control stage 630 are transmitted in a transmission stage 640. Then the procedure returns to the test stage 610 to investigate again whether there is any more information to send.

The examples of the invention given make possible the transmission of data without the normal radar function being affected basically because the radar receiver is always synchronized with the transmitted pulse. The choice of encoding method depends on the application, the type of radar, the required information transmission rate and the design of the information receiver.

The invention concerns the information coding of radar pulses in a radar unit in order to obtain the transmission of information with simultaneous radar function without loss of radar performance. The invention can be used for a number of different types of pulse radar, including various types of pulse Doppler radar. Pulse compression can be used in association with the invention, as the invention is not dependent upon how the radar pulses are shaped and does not distort the radar pulses. A radar unit that uses the invention can of course be designed for two-way communication.

The invention is not restricted to the embodiments mentioned above but can be varied within the scope of the following patent claims.

What is claimed is:

1. A procedure for transmitting information in a pulse radar device simultaneously with the ordinary radar function of the pulse radar device, where the pulse radar device comprises a control unit, a radar transmitter and an antenna, where the control unit controls the radar transmitter to generate radar pulses that are transmitted via the antenna thereof, the procedure comprising information coding the radar pulses for the ordinary radar function in at least one pulse group with the information that is to be transmitted by a pulse group position coding where all the radar pulses in a pulse group are position coded in such a way that the radar pulses of the pulse group are transmitted with retained ordinary radar function.

2. Procedure according to claim 1, wherein the position coding of all of the radar pulses of a pulse group is carried out by time displacements of equal magnitude relative to the respective nominal radar pulse positions of the radar pulses of all the radar pulses of a pulse group to thereby information code a pulse group by determining a time displacement of the pulse group.

3. Procedure according to claim 1, wherein the position coding of all the radar pulses of a pulse group is carried out by time displacing the radar pulses of the pulse group relative to the first radar pulse of the pulse group in such a way that a time diplacement of equal magnitude between all of the pulses of the pulse group is attained to thereby information code a pulse group by determining the pulse repetition frequency of the pulse group.

4. Procedure according to claim 1, wherein the position coding of all of the radar pulses of a pulse group is carried out by transmitting the first radar pulse of the pulse group at its nominal radar pulse position and the remaining radar pulses of the pulse group are time displaced in such a way that a time displacement of equal magnitude between all of the radar pulses of the pulse group is attained to thereby information code a pulse group by determining the pulse repetition frequency of the pulse group.

5. Procedure according to claim 1, wherein the information coding is carried out by determining the sequence of different pulse group position codings.

6. Procedure according to claim 1, wherein the information coding is carried out by a combination of determining the pulse repetition frequency of the pulse group and also by determining a time displacement of the pulse group.

7. Procedure for controlling a radar unit in order to make possible the transmission of information from the radar with simultaneous radar function using the radar unit's radar pulses, wherein the procedure comprising:

a control stage in which the number of pulse groups that must be transmitted in order to retain a correct ordinary radar function is determined and in which the times of transmission of the radar pulses of the pulse groups are determined whereby an information coding of the information that is to be transmitted is carried out by a pulse group position coding where all the radar pulses of at least one pulse group are position coded in such a way that the radar pulses of the pulse group are transmitted with retained ordinary radar function.

8. Procedure according to claim 7, wherein the procedure also comprises:

an information accumulation stage in which information that is to be transmitted is collected and forms an information quantity either during a predetermined period of time or until a predetermined amount of information is collected, depending upon which of these conditions is fulfilled first, and wherein the number of pulse groups that are to be transmitted is determined in the control stage, also dependent upon the quantity of information.

9. Procedure according to claim 8, wherein the information accumulation stage and the control stage are repeated continually as long as the radar function or the transmission of information is required.

10. Procedure according to claim 7, wherein the position coding of all of the radar pulses of a pulse group is carried out by time displacements of equal magnitude relative to the respective nominal radar pulse positions of the radar pulses of all the radar pulses of a pulse group to thereby information code a pulse group by determining a time displacement of the pulse group.

11. Procedure according to claim 7, wherein the position coding of all the radar pulses of a pulse group is carried out by time displacing the radar pulses of the pulse group relative to the first radar pulse of the pulse group in such a way that a time diplacement of equal magnitude between all of the pulses of the pulse group is attained to thereby information code a pulose group by determining the pulse repetition frequency of the pulse group.

12. Procedure according to claim 7, wherein the position coding of all of the radar pulses of a pulse group is carried out by transmitting the first radar pulse of the pulse group at its nominal radar pulse position and the remaining radar pulses of the pulse group are time displaced in such a way that a time displacement of equal magnitude between all of the radar pulses of the pulse group is attained to thereby information code a pulse group by determining the pulse repetition frequency of the pulse group.

13. Procedure according to claim 7, wherein the information coding is carried out by determining the sequence of different pulse group position codings.

14. Procedure according to claim 7, wherein the information coding is carried out by a combination of determining the pulse repetition frequency of the pulse group and also by determining a time displacement of the pulse group.

15. Procedure according to claim 7, wherein the information coding is carried out by the position coding of consecutive pulse groups.

16. Procedure for receiving and information decoding radar pulses in an information receiver and thereby recreating an information copy of the information that was encoded and transmitted by a radar device, the procedure comprising:

a first calculation stage in which an expected radar pulse position is calculated for each radar pulse received;

a second calculation stage in which a time displacement of each radar pulse received is calculated relative to the respective calculated expected radar pulse position;

a pulse repetition frequency calculation stage in which the pulse repetition frequencies of the received radar pulses are calculated;

a third calculation stage in which the information copy is calculated from one or more calculated time displacements and by the calculated pulse repetition frequencies of the received radar pulses.

17. Procedure according to claim 16, wherein the procedure also comprising:

an identification stage in which the type of information coding by the radar device is identified from the radar pulses received;

and in that the information copy is also calculated in the third calculation stage from the identified information coding type.

18. Procedure for receiving and information decoding radar pulses in an information receiver and thereby recreating an information copy of the information that was encoded and transmitted by a radar device, the procedure comprising:

a pulse repetition frequency calculation stage in which the pulse repetition frequency of radar pulses received is calculated;

a calculation stage in which the information copy is calculated from one or more calculated pulse repetition frequencies.

19. Procedure for transmitting information between a radar unit and an information receiver using the radar unit's radar pulses, wherein the procedure comprises:

a control stage in the radar unit in which the number of pulse groups that must be transmitted in order to retain a correct ordinary radar function is determined and in which the times of transmission of the radar pulses of the pulse groups are determined whereby an information coding of the information that is to be transmitted is carried out by a pulse group position coding where all radar pulses of at least one pulse group are position coded in such a way that the radar pulses of the pulse group are transmitted with retained ordinary radar function;

a first calculation stage in the information receiver in which an expected radar pulse position is calculated for each radar pulse received where the expected radar pulse position for a radar pulse in the information receiver corresponds to the nominal radar pulse position for the same radar pulse in the radar unit;

a second calculation stage in the information receiver in which a time displacement of each radar pulse received is calculated relative to the respective calculated expected radar pulse position; and a third calculation stage in the information receiver in which the information copy is calculated from one or more calculated time displacements.

20. Pulse radar device for transmitting information together with its ordinary radar function, the pulse radar device comprising a control unit, a radar transmitter, a radar receiver and an antenna, in which the control unit is configured to control the radar transmitter to generate radar pulses that are transmitted via the antenna, and is configured in conjunction with the controlling of the radar transmitter to control the radar receiver to receive target echo signals of the transmitted radar signals via the antenna for target detection and measurement of target data, and the control unit is also configured to information code the radar pulses in at least one pulse group with the information that is to be transmitted by controlling the radar transmitter and the radar receiver so that all of the radar pulses of a pulse group are position coded in such a way that the radar pulses of the pulse group are transmitted with retained ordinary radar function.

21. Pulse radar device according to claim 20, wherein the position coding of all of the radar pulses of a pulse group is carried out by time displacements of equal magnitude relative to the respective nominal radar pulse positions of the radar pulses of all the radar pulses of a pulse group to thereby information code a pulse group by determining a time displacement of the pulse group.

22. Pulse radar device according to claim 20, wherein the position coding of all the radar pulses of a pulse group is carried out by time displacing the radar pulses of the pulse group relative to the first radar pulse of the pulse group in such a way that a time diplacement of equal magnitude between all of the pulses of the pulse group is attained to thereby information code a pulse group by determining the pulse repetition frequency of the pulse group.

23. Pulse radar device according to claim 20, wherein the position coding of all of the radar pulses of a pulse group is carried out by transmitting the first radar pulse of the pulse group at its nominal radar pulse position and the remaining radar pulses of the pulse group are time displaced in such a way that a time displacement of equal magnitude between all of the radar pulses of the pulse group is attained to thereby information code a pulse group by determining the pulse repetition frequency of the pulse group.

24. Pulse radar device according to claim 20, wherein the information coding is carried out by determining the sequence of different pulse group position codings.

25. Pulse radar device according to claim 20, wherein the information coding is carried out by a combination of determining the pulse repetition frequency of the pulse group and also by determining a time displacement of the pulse group.

26. Pulse radar device according to claim 20, wherein the information coding is carried out by the position coding of consecutive pulse groups.

27. Information receiver for receiving and information decoding radar pulses in pulse groups and thereby recreating in the form of an information copy information that has been encoded and transmitted by a radar device, where the information receiver comprises an antenna, a receiver and a decoder, in which the receiver is configured to receive radar pulses via the antenna and to convert the radar pulses to signals modified for the decoder, and to pass these modified signals to the decoder, and the decoder is for each received pulse group configured to calculate the time displacement of each radar pulse received relative to a corresponding calculated expected radar pulse position and the decoder is also configured to be able to identify from the pulse groups received what type of information coding the radar device uses to encode the information that is transmitted and the decoder from one or more calculated time displacements and from the identified information coding calculates and recreates the information that was encoded and transmitted by the radar device.

28. Information receiver for receiving and information decoding radar pulses in pulse groups and thereby recreating in the form of an information copy information that has been encoded and transmitted by a radar device, the information receiver comprising an antenna, a receiver and a decoder, whereby the receiver is configurated to receive radar pulses via the antenna and to convert the radar pulses to signals modified for the decoder, and to pass these modified signals to the decoder, and the decoder is configured to calculate a pulse repetition frequency for each pulse group received and to thereafter calculate the information copy from one or more calculated pulse repetition frequencies and to thereby recreate the information that was encoded and transmitted by the radar device.

* * * * *